(12) United States Patent
Oishi

(10) Patent No.: US 12,194,644 B2
(45) Date of Patent: Jan. 14, 2025

(54) WORK ROBOT AND WORK SYSTEM

(71) Applicant: FUJI CORPORATION, Chiryu (JP)

(72) Inventor: Nobuo Oishi, Kosai (JP)

(73) Assignee: FUJI CORPORATION, Chiryu (JP)

( * ) Notice: Subject to any disclaimer, the term of this patent is extended or adjusted under 35 U.S.C. 154(b) by 356 days.

(21) Appl. No.: 17/761,446

(22) PCT Filed: Sep. 18, 2019

(86) PCT No.: PCT/JP2019/036529
§ 371 (c)(1),
(2) Date: Mar. 17, 2022

(87) PCT Pub. No.: WO2021/053750
PCT Pub. Date: Mar. 25, 2021

(65) Prior Publication Data
US 2022/0241982 A1    Aug. 4, 2022

(51) Int. Cl.
*B25J 9/16* (2006.01)
*B25J 13/08* (2006.01)
(Continued)

(52) U.S. Cl.
CPC ........... *B25J 9/1697* (2013.01); *B25J 9/1666* (2013.01); *B25J 13/08* (2013.01); *G05B 19/4155* (2013.01);
(Continued)

(58) Field of Classification Search
CPC ...... B25J 9/0093; B25J 9/1666; B25J 9/1697; B25J 13/08; G05B 19/4155;
(Continued)

(56) References Cited

U.S. PATENT DOCUMENTS 6,328,523 B1    12/2001   Watanabe et al.
7,177,459 B1 *   2/2007   Watanabe .............. B25J 9/1697
                                                        382/152
(Continued)

FOREIGN PATENT DOCUMENTS

CN    108284443 A     7/2018
EP    0 951 968 A2   10/1999
(Continued)

OTHER PUBLICATIONS

International Search Report mailed on Nov. 26, 2019 in PCT/JP2019/036529 filed on Sep. 18, 2019 (citing references AA-AC, AP-AT, therein, 2 pages).

*Primary Examiner* — Katrina R Fujita
(74) *Attorney, Agent, or Firm* — Oblon, McClelland, Maier & Neustadt, L.L.P.

(57) ABSTRACT

A work robot sequentially holds multiple workpieces supplied to a supply area and moves the held workpieces to a work area. The work robot includes an image-capturing device configured to capture images of the multiple workpieces supplied to the supply area in random orientations and positions, an image processing device configured to recognize multiple workpiece regions from the images captured by the image-capturing device, obtain an area and a position of each of the recognized multiple workpiece regions, and obtain a distance between each workpiece region and the work area or the work robot, and a control device configured to determine a holding order of the workpiece based on the areas of the multiple workpiece regions and the distance between each workpiece region and the work area or the work robot as obtained by the image processing device.

4 Claims, 10 Drawing Sheets

(51) Int. Cl.
| | |
|---|---|
| *G05B 19/4155* | (2006.01) |
| *G06T 7/50* | (2017.01) |
| *G06T 7/73* | (2017.01) |
| *G06V 20/00* | (2022.01) |
| *B25J 9/00* | (2006.01) |

(52) U.S. Cl.
CPC .................. *G06T 7/50* (2017.01); *G06T 7/74* (2017.01); *B25J 9/0093* (2013.01); *G05B 2219/40269* (2013.01); *G06T 2207/30164* (2013.01); *G06T 2207/30242* (2013.01); *G06V 20/00* (2022.01); *G06V 2201/06* (2022.01)

(58) Field of Classification Search
CPC ........... G05B 2219/37555; G05B 2219/39106; G05B 2219/40007; G05B 2219/40053; G05B 2219/40269; G05B 2219/40564; G05B 2219/50394; G06T 7/50; G06T 7/74; G06T 2207/30164; G06T 2207/30242; G06V 20/00; G06V 2201/06
See application file for complete search history.

(56) References Cited

U.S. PATENT DOCUMENTS

| | | | | |
|---|---|---|---|---|
| 2004/0117066 A1* | 6/2004 | Ban | ....................... | G06T 1/0014 700/250 |
| 2004/0122552 A1* | 6/2004 | Ban | ....................... | B25J 9/1697 700/214 |
| 2010/0004778 A1* | 1/2010 | Arimatsu | .............. | G06T 1/0014 700/214 |
| 2011/0251717 A1 | 10/2011 | Furukawa | | |
| 2014/0121836 A1* | 5/2014 | Ban | ........................ | B25J 9/0093 700/259 |
| 2014/0277731 A1* | 9/2014 | Kamiya | .................. | B25J 9/1676 700/259 |
| 2014/0316573 A1* | 10/2014 | Iwatake | ................. | B25J 9/1694 700/258 |
| 2014/0365010 A1* | 12/2014 | Yasuda | .................. | G06V 20/64 348/91 |
| 2017/0057092 A1 | 3/2017 | Ito | | |
| 2017/0177746 A1* | 6/2017 | Gotou | ..................... | G06F 30/00 |
| 2018/0085922 A1* | 3/2018 | Ooba | ..................... | B25J 9/1679 |
| 2018/0257225 A1* | 9/2018 | Satou | ..................... | B25J 9/1697 |
| 2018/0290300 A1* | 10/2018 | Niwayama | ............. | B25J 9/1687 |
| 2018/0290307 A1* | 10/2018 | Watanabe | ................. | G06T 7/97 |
| 2019/0329409 A1* | 10/2019 | Yamada | .................. | B25J 9/1661 |
| 2019/0385329 A1* | 12/2019 | Fujii | ....................... | B25J 9/1671 |
| 2021/0065351 A1* | 3/2021 | Yamaji | ..................... | G06F 17/18 |

FOREIGN PATENT DOCUMENTS

| | | |
|---|---|---|
| EP | 3 346 446 A1 | 7/2018 |
| JP | 11-300670 A | 11/1999 |
| JP | 2009-523623 A | 6/2009 |
| JP | 2010-89238 A | 4/2010 |
| JP | 2014-108868 A | 6/2014 |
| JP | 2014-205209 A | 10/2014 |
| JP | 2017-42859 A | 3/2017 |

* cited by examiner

Fig. 10
Fig. 10A
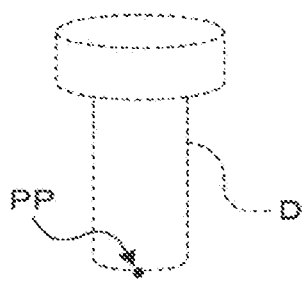
Fig. 10B
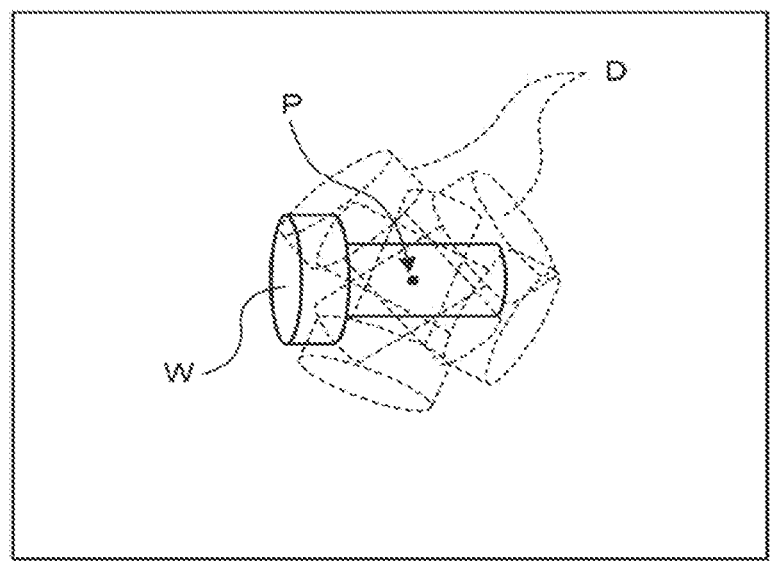
Fig. 10C
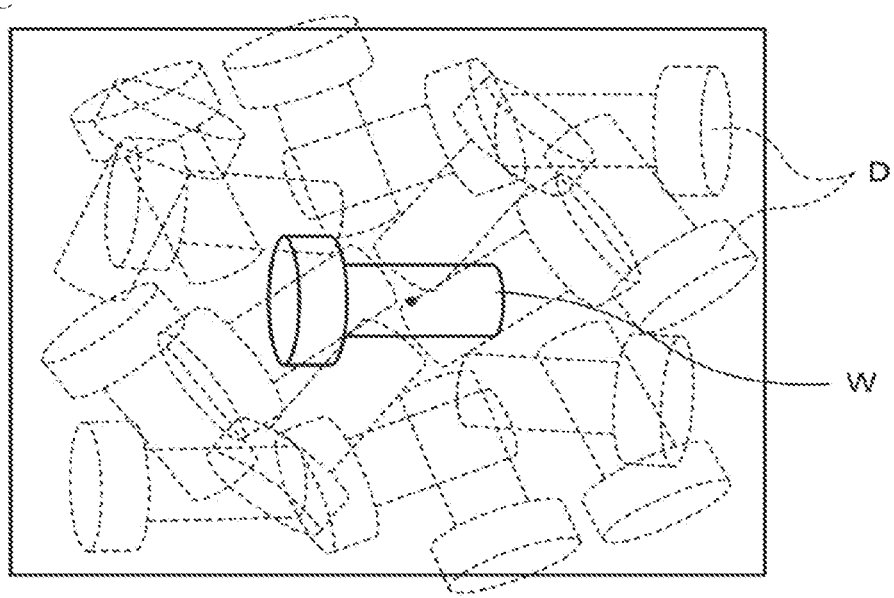

Fig. 11
Fig. 11A
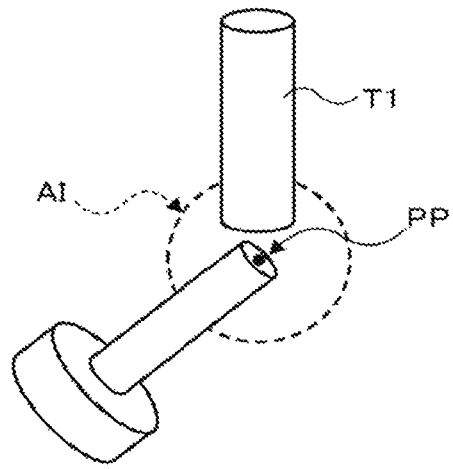
Fig. 11B
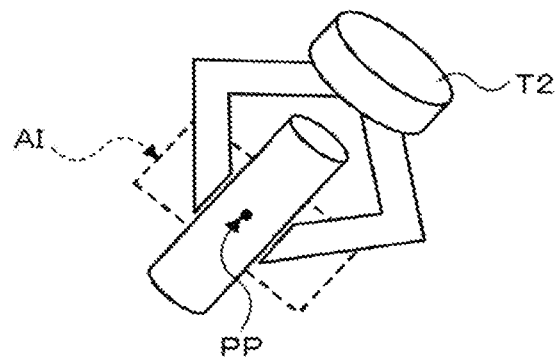
Fig. 11C
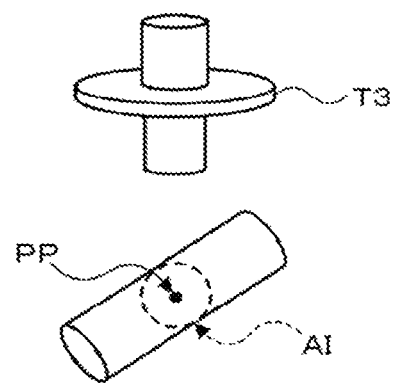

Fig. 12
Fig. 12A
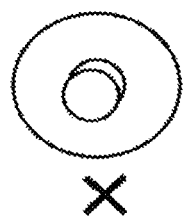
Fig. 12B
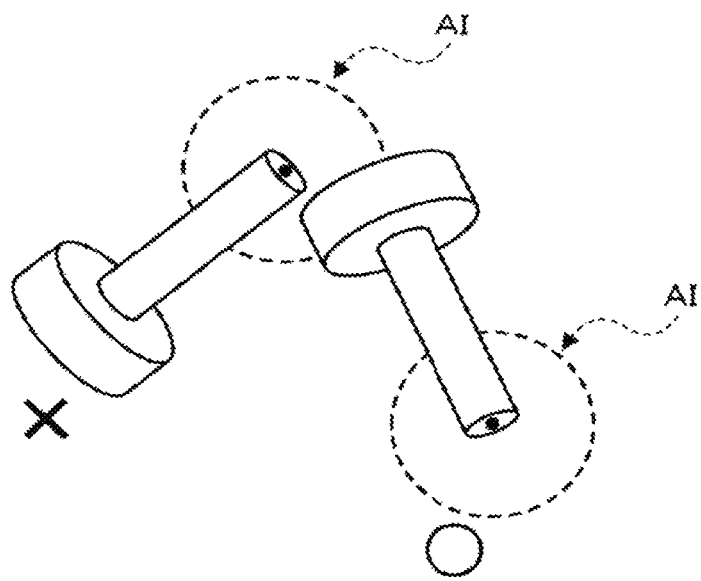

WORK ROBOT AND WORK SYSTEM

TECHNICAL FIELD

The present specification discloses a work robot.

BACKGROUND ART

Conventionally, there has been proposed a work robot which is configured by an articulated robot and grips workpieces placed in bulk in a container one by one (refer to Patent Literature 1, for example). In this work robot, a workpiece at a highest position is selected from among the workpieces placed in bulk, and when the selected workpiece partially does not overlap with other adjacent workpieces, the workpiece is gripped.

PATENT LITERATURE

Patent Literature 1: PCT Japanese Translation Patent Publication No. 2009-523623

BRIEF SUMMARY

Technical Problem

In a case where a workpiece is placed in random orientations and positions in bulk on a general-purpose supply device such as a case (container) or a conveyor, it is necessary for an articulated robot to capture an image of the workpiece in random orientations and positions, recognize an interference state between a position, a direction, and a posture of a gripping target workpiece (target workpiece) and a workpiece (non-target workpiece) which is not the gripping target based on the captured image, and confirm whether the target workpiece can be gripped. Since the recognition processing is generally burdensome and requires a long time for processing, it is desirable to first collectively perform the recognition processing on multiple workpieces. However, when the non-target workpiece is adjacent to the target workpiece, the target workpiece may come into contact with the non-target workpiece when the target workpiece is gripped and taken out, and thus, there is a concern that a position of the non-target workpiece is changed. Therefore, in a case where the non-target workpiece is gripped as the next target workpiece based on a result of the recognition processing performed first, the articulated robot cannot appropriately grip the target workpiece. In this case, since the articulated robot needs to perform the recognition processing again, work efficiency deteriorates.

A principal object of the present disclosure is to provide a work robot capable of efficiently holding multiple workpieces supplied to a supply area in random orientations and positions.

Solution to Problem

The present disclosure adopts the following means in order to achieve the principal object described above.

According to an aspect of the present disclosure, there is provided a work robot for sequentially holding multiple workpieces supplied to a supply area and moving the held workpieces to a work area, the work robot including: an image-capturing device configured to capture images of the multiple workpieces supplied to the supply area in random orientations and positions; an image processing device configured to recognize multiple workpiece regions from the images captured by the image-capturing device, obtain an area and a position of each of the recognized multiple workpiece regions, and obtain a distance between each workpiece region and the work area or the work robot; and a control device configured to determine a holding order of the workpiece based on the areas of the multiple workpiece regions and the distance between each workpiece region and the work area or the work robot as obtained by the image processing device.

The work robot of the present disclosure sequentially holds the multiple workpieces supplied to the supply area and moves the held workpieces to the work area. The work robot performs image recognition to capture images of the multiple workpieces supplied to the supply area in random orientations and positions, recognize multiple workpiece regions from the obtained images, obtain an area and a position of each of the recognized multiple workpiece regions, and obtain a distance between each workpiece region and the work area or the work robot. Then, the work robot determines the holding order of the workpiece based on the obtained area and distance. When it is difficult to vertically raise and lower the arm due to structural reasons, the work robot moves a target workpiece to the work area side or the work robot side on the supply area when holding the target workpiece which is a holding target. Therefore, when a non-target workpiece other than the holding target is adjacent to the work area side with respect to the target workpiece, the target workpiece may contact the non-target workpiece, and thus, there is a concern that the position of the non-target workpiece is changed. Accordingly, the work robot of the present disclosure determines the holding order of the multiple workpieces supplied in the random orientations and positions in consideration of the situation, and thus, can sequentially hold the multiple workpieces and move the multiple workpieces to the work area using the result of the image recognition performed first. As a result, it is possible to provide the work robot capable of efficiently holding multiple workpieces supplied to the supply area in the random orientations and positions.

BRIEF DESCRIPTION OF DRAWINGS

FIG. 10A is an explanatory diagram showing an example of workpiece shape model D.

FIG. 10B is an explanatory diagram showing a state in which workpiece W is searched using workpiece shape model D when a search range is narrowed down.

FIG. 10C is an explanatory diagram showing a state in which workpiece W is searched using workpiece shape model D when the search range is not narrowed down.

FIG. 11A is an explanatory diagram showing interference check region AI of picking tool T1 (electromagnetic chuck) used to grip a bolt-shaped workpiece.

FIG. 11B is an explanatory diagram showing interference check region AI of picking tool T2 (mechanical chuck) used to grip a cylindrical workpiece.

FIG. 11C is an explanatory diagram showing interference check region AI of picking tool T3 (suction nozzle) used to grip a bolt-shaped workpiece.

FIG. 12A is an explanatory diagram showing a result of an interference check.

FIG. 12B is an explanatory diagram showing the result of the interference check.

DESCRIPTION OF EMBODIMENTS

Next, embodiments of the present disclosure will be described with reference to the drawings.

Figure 1:
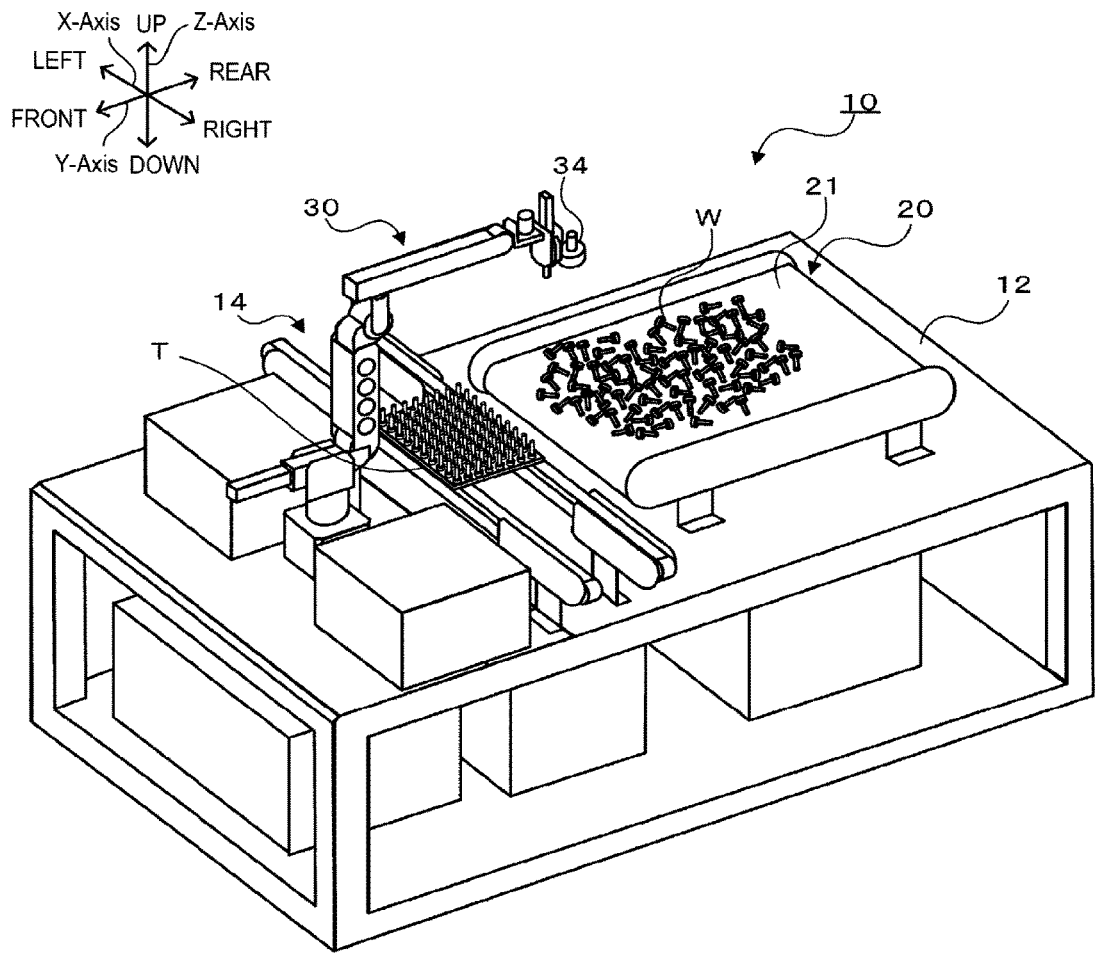
FIG. 1 is a configuration diagram schematically showing a configuration of work system 10 including a work robot of the present embodiment.
Figure 2:
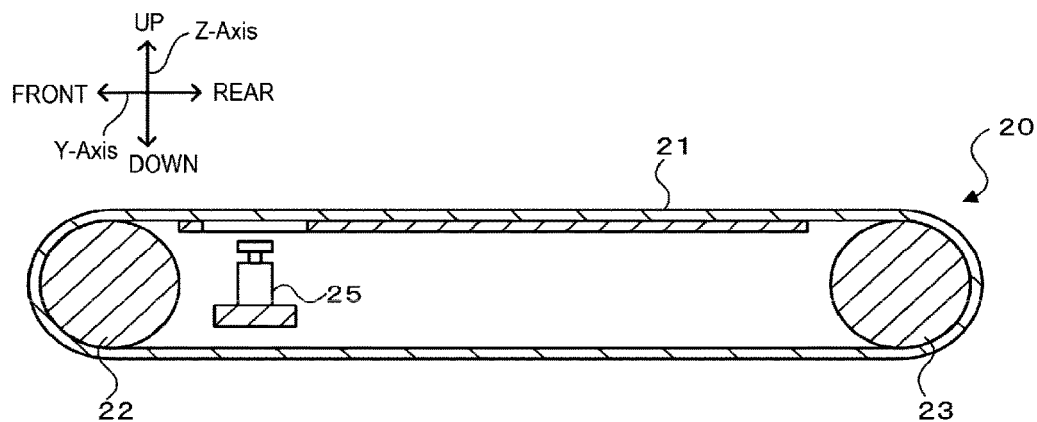
FIG. 2 is a cross-sectional view of workpiece supply device 20.
Figure 3:
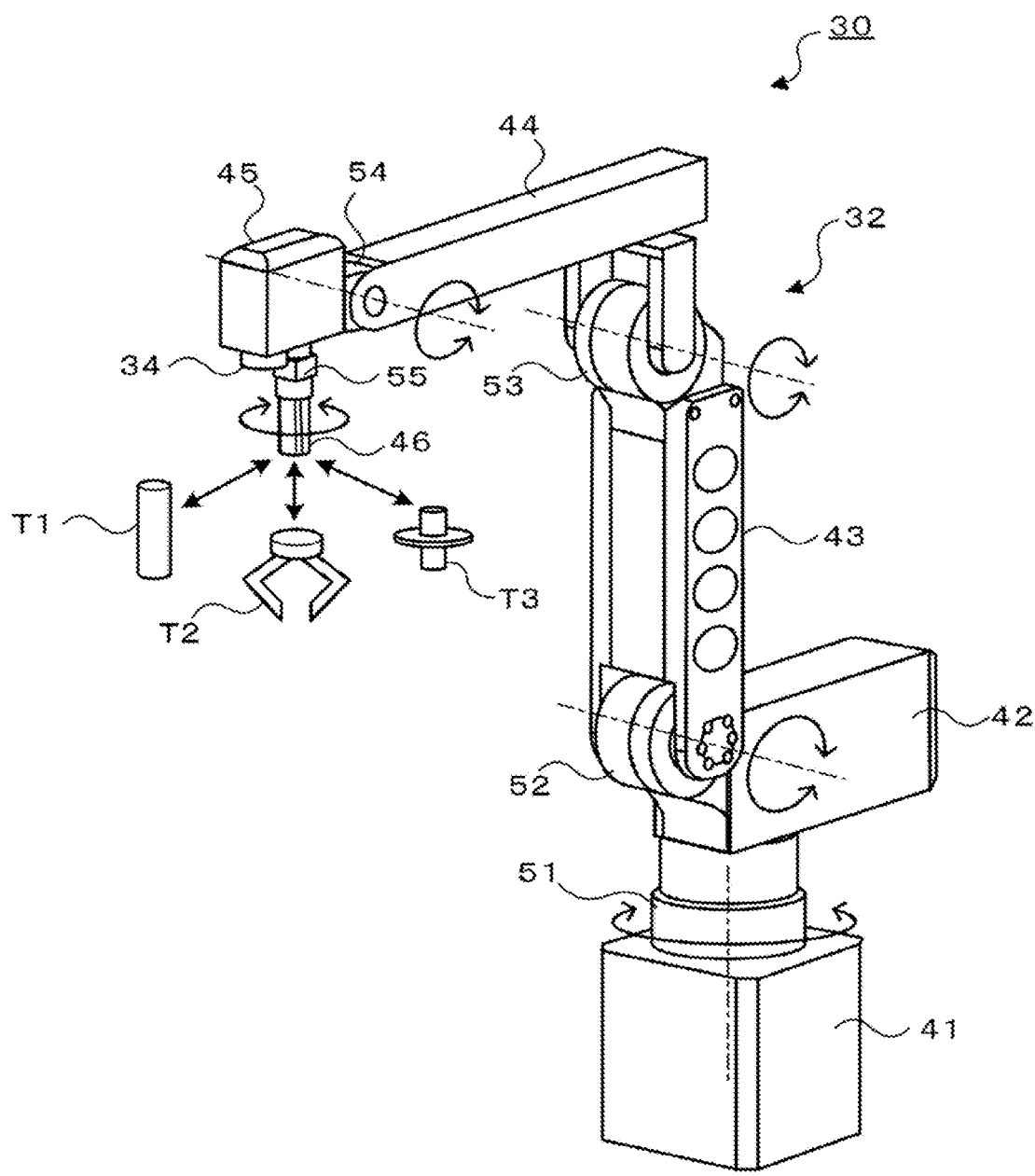
FIG. 3 is a configuration diagram schematically showing a configuration of robot main body 30 of a work robot.
Figure 4:
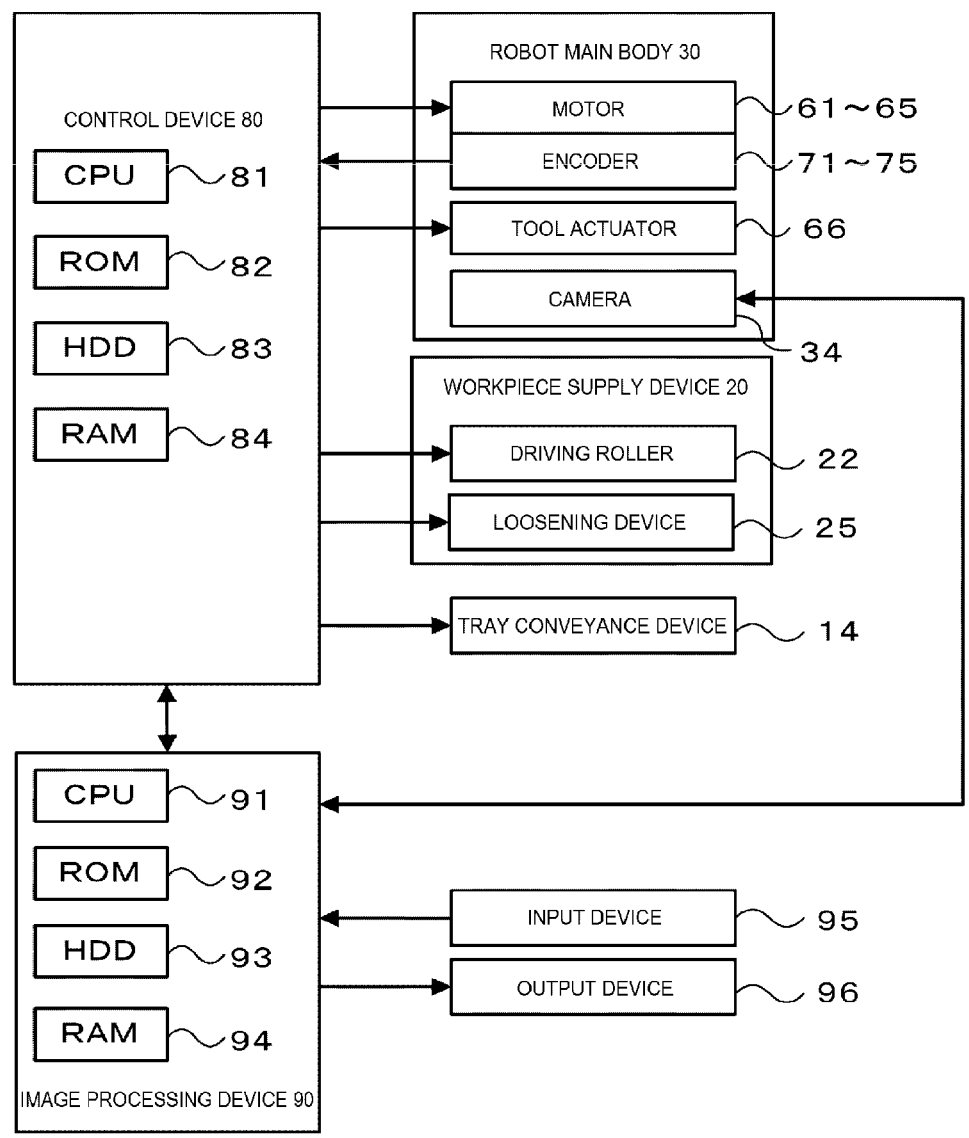
FIG. 4 is a block diagram showing an electrical connection relationship among robot main body 30, control device 80, and image processing device 90.

FIG. 1 is a configuration diagram schematically showing a configuration of work system 10 including a work robot of the present embodiment. FIG. 2 is a configuration diagram schematically showing a configuration of workpiece supply device 20. FIG. 3 is a configuration diagram schematically showing a configuration of robot main body 30 of the work robot. FIG. 4 is a block diagram showing an electrical connection relationship among robot main body 30, control device 80, and image processing device 90 of the work robot. In FIG. 1, a right-left direction is an X-axis direction, a front-rear direction is a Y-axis direction, and an up-down direction is a Z-axis direction.

As shown in FIG. 1, work system 10 includes workpiece supply device 20 and a work robot. In the present embodiment, work system 10 is configured as a pick-and-place system that picks (grips) workpiece W supplied by workpiece supply device 20, aligns picked workpiece W in a predetermined posture on tray T conveyed by tray conveyance device 14, and places workpiece W. It should be noted that work system 10 is not limited to the pick-and-place system, and can be applied to any work system as long as a work robot is used to sequentially hold workpiece W located at a supply area and move workpiece W to a work area, such as a mounting system that grips workpiece W and moves workpiece W to the work area and mounts workpiece W on a target object in the work area, for example.

Tray conveyance device 14 has a pair of belt conveyors spanned in the right-left direction (the X-axis direction) at intervals in the front-rear direction (the Y-axis direction). Tray T is conveyed to the work area of the work robot by a belt conveyor.

Workpiece supply device 20 conveys multiple workpieces W placed on upper surface of conveyor belt 21 in random orientations and positions by a replenishing device such as a hopper device to a position (supply area) at which the work robot can pick up workpieces W. As shown in FIG. 2, conveyor belt 21 is spanned by driving roller 22 and driven roller 23 that are disposed at intervals in the front-rear direction (the Y-axis direction). Workpiece supply device 20 drives driving roller 22 to convey multiple workpieces W placed on the upper surface of conveyor belt 21. Loosening device 25 is provided on a rear surface side of conveyor belt 21. Loosening device 25 strikes the rear surface of conveyor belt 21 to vibrate the upper surface of conveyor belt 21 in the up-down direction. As a result, even when multiple workpieces W are placed on the upper surface of conveyor belt 21 in a lump state, the lump of multiple workpieces W is loosened by loosening device 25.

The work robot includes robot main body 30, control device 80, and image processing device 90.

As shown in FIG. 3, robot main body 30 includes a vertical articulated arm (hereinafter, referred to as an arm) 32 having five axes. Arm 32 has six links (first to sixth links 41 to 46), and five joints (first to fifth joints 51 to 55) which rotatably or pivotally connect between the links. Each joint (first to fifth joints 51 to 55) is provided with motors (servo motors) 61 to 65 for driving the corresponding joint, and encoders (rotary encoders) 71 to 75 for detecting rotational positions of the corresponding motors.

Multiple types of picking tools T1 to T3 as end effectors are detachably attached to a distal link (sixth link 46) of arm 32. In the present embodiment, picking tool T1 is an electromagnetic chuck, using an electromagnet, which is configured to pick up workpiece W made of a magnetic material. Picking tool T2 is a mechanical chuck (hereinafter, referred to as a mechanical chuck) having a pair of clamp claws movable between a nearby position for holding workpiece W and a separation position for releasing the holding of workpiece W. Picking tool T3 is a suction nozzle that picks up workpiece W by negative pressure. The picking tools that are mounted on the distal link are appropriately selected in accordance with the shape or material of workpiece W to be picked up.

Camera 34 is attached to arm 32 (fifth link 45). Camera 34 captures the image of each workpiece W supplied to the supply area by workpiece supply device 20 in order to recognize the position and posture of workpiece W, or captures an image of tray T in order to recognize the position of tray T conveyed by tray conveyance device 14.

As shown in FIG. 1, tray conveyance device 14, workpiece supply device 20, and robot main body 30 are installed on support table 12. In the present embodiment, workpiece supply device 20 and robot main body 30 are disposed at predetermined intervals in the front-rear direction (the Y-axis direction). Tray conveyance device 14 is installed between workpiece supply device 20 and robot main body 30.

As shown in FIG. 4, control device 80 is configured as a microprocessor centered on CPU 81, and includes ROM 82, HDD 83, RAM 84, an input/output interface (not shown), a communication interface (not shown), and the like in addition to CPU 81. Detection signals from encoders 71 to 75 and the like are inputted to control device 80. In addition, control device 80 outputs control signals to tray conveyance device 14, workpiece supply device 20, motors 61 to 65, tool actuator 66, and the like. Tool actuator 66 is an actuator for driving the picking tool mounted on robot main body 30.

As shown in FIG. 4, image processing device 90 is configured as a microprocessor centered on CPU 91, and includes ROM 92, HDD 93, RAM 94, an input/output interface (not shown), a communication interface (not shown), and the like in addition to CPU 91. An image signal from camera 34, an input signal from input device 95, and the like are inputted to image processing device 90. In addition, drive signal to camera 34, an output signal to output device 96, and the like are output from image processing device 90. Here, input device 95 is an input device for an operator to perform an input operation, such as a keyboard and a mouse. Output device 96 is a display device for displaying various information, such as a liquid crystal display, for example. Image processing device 90 is communicably connected to control device 80, and exchanges control signals and data with each other.

Figure 5:
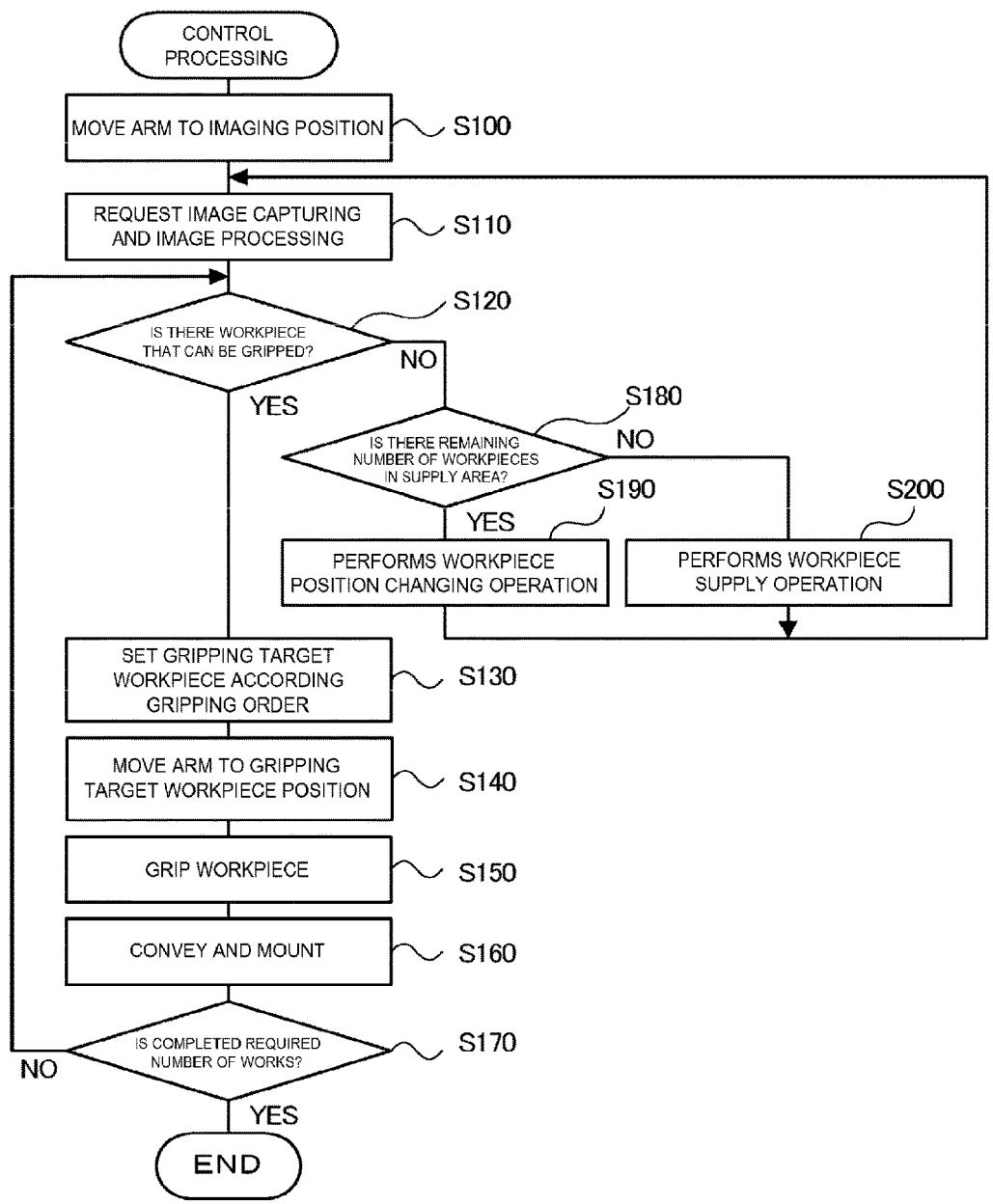
FIG. 5 is a flowchart showing an example of control processing executed by control device 80.
Figure 6:
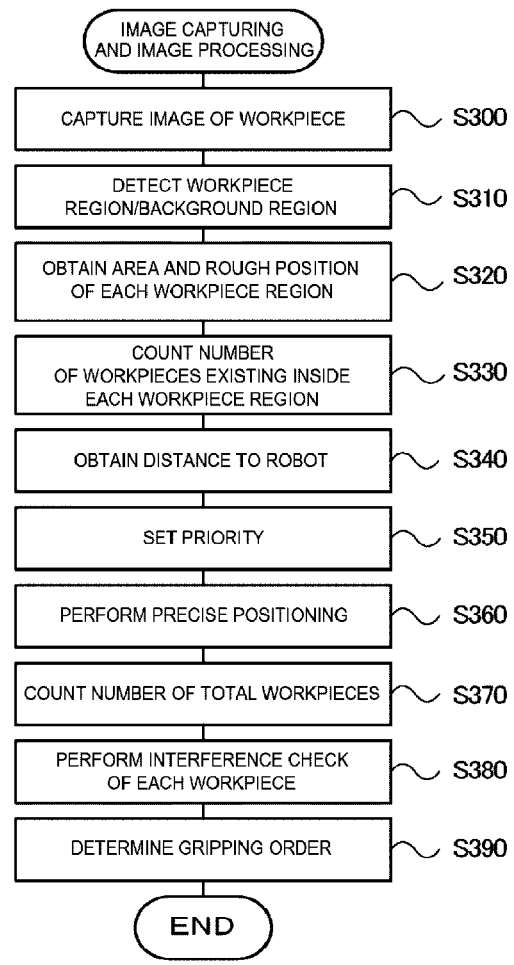
FIG. 6 is a flowchart showing an example of image capturing and image processing executed by image processing device 90.

Next, an operation of work system 10 configured as described above, particularly an operation of control device 80 and an operation of image processing device 90 will be described. FIG. 5 is a flowchart showing an example of control processing executed by control device 80. FIG. 6 is a flowchart showing an example of image capturing and image processing executed by image processing device 90. First, the operation of control device 80 will be described, and thereafter, the operation of image processing device 90 will be described.

When the control processing is executed, first, CPU 81 of control device 80 controls each of motors 61 to 65 so that arm 32 (camera 34) moves to the imaging position of workpiece W supplied by workpiece supply device 20 (S100), and requests image processing device 90 to capture the image of workpiece W and perform the image processing (S110). Image processing device 90 executes the image capturing and image processing in response to the request from control device 80, and determines a gripping order of workpiece W recognized by the image capturing and image processing. Details of the image capturing and image processing will be described below.

Next, CPU 81 determines whether there is workpiece W that can be gripped (S120). When it is determined that there is workpiece W that can be gripped, CPU 81 sets workpiece W having the earliest gripping order determined by image processing device 90 among the workpieces W that can be gripped as a target workpiece which is a gripping target (S130). Subsequently, CPU 81 controls each of motors 61 to 65 so that arm 32 moves to the position of the set target workpiece (S140), and controls tool actuator 66 so that the target workpiece is gripped (S150). Specifically, the processing in Step S140 is performed by acquiring a target position of each joint of arm 32 corresponding to a target gripping position and a gripping posture, and controlling motors 61 to 65 so as to move to the target position acquired by each joint.

When workpiece W is gripped, CPU 81 controls each of motors 61 to 65 so that gripped workpiece W moves to the target position of tray T conveyed to the work area by tray conveyance device 14, and controls tool actuator 66 so that workpiece W is placed at the target position (gripping of workpiece W is released) (S160). Then, CPU 81 determines whether the required number of works have been completed (S170). When it is determined that the required number of works have not been completed, CPU 81 returns the step to Step S120 to repeat the processing in Steps S120 to S170, and when it is determined that the required number of works have been completed, CPU 81 now ends the control processing.

When it is determined in Step S120 that there are no workpiece W that can be gripped in the process of repetitive processing of Steps S120 to S170, CPU 81 determines whether there is a remaining number of workpieces W in the supply area (S180). When it is determined that there is the remaining number of workpieces W, there are lumps in which multiple workpieces W interfere with each other, and CPU 81 performs a workpiece position changing operation for driving and controlling loosening device 25 to vibrate upper surface of conveyor belt 21 in order to loosen the workpiece lumps and change the position of workpiece W (S190). Meanwhile, when it is determined that there is no remaining number of workpieces W, CPU 81 performs a workpiece supply operation for driving and controlling workpiece supply device 20 to supply workpiece W to the supply area (S200). When CPU 81 performs the workpiece position changing operation or the workpiece supply operation in this manner, CPU 81 returns the step to Step S110 to request image processing device 90 to perform the image capturing and image processing in order to perform the image recognition of workpiece W again. As described above, when multiple workpieces W are supplied to the supply area, control device 80 finds workpieces W that can be gripped by performing the image recognition first, determines the gripping order, and sequentially grips and conveys workpieces W according to the determined gripping order until there are no more workpieces W that can be gripped. Then, when there are no more workpieces W that can be gripped, control device 80 loosens the lump of workpieces W by loosening device 25 when there is the remaining number of workpieces W in the supply area and performs the image recognition again. In addition, when there is no remaining number of workpieces W in the supply area, control device 80 drives workpiece supply device 20 to supply workpiece W to the supply area. Since the image recognition of workpiece W requires a certain amount of time, it is possible to shorten a work time by reducing the number of executions of the image recognition.

Figure 7:
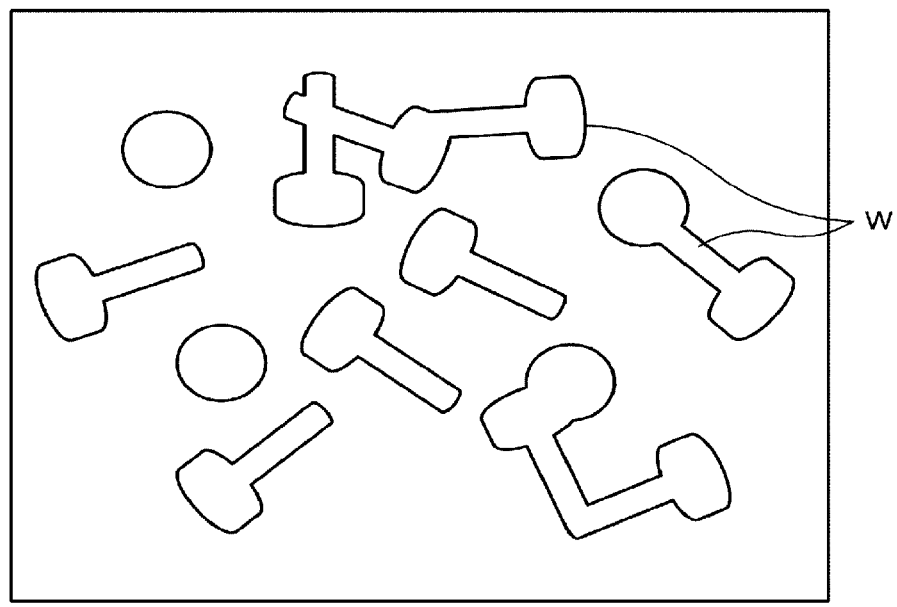
FIG. 7 is an explanatory diagram showing an example of a captured image of a workpiece.
Figure 8:
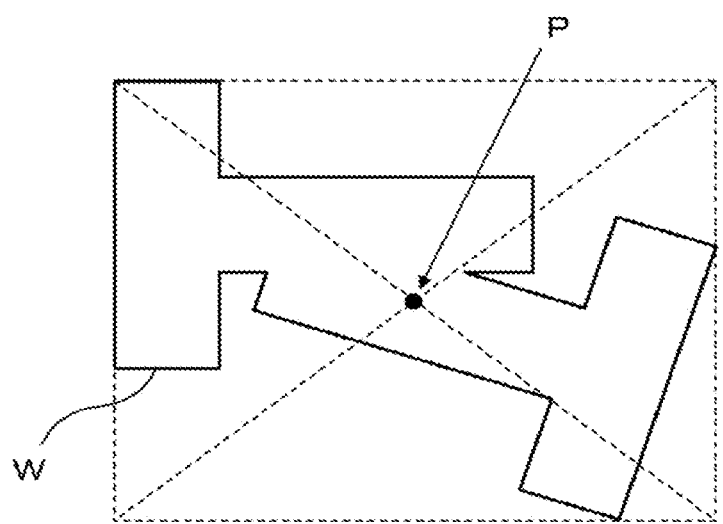
FIG. 8 is an explanatory diagram showing a state of rough positioning.

Next, the operation of image processing device 90 will be described. FIG. 6 is a flowchart showing an example of image capturing and image processing executed by image processing device 90. When the image capturing and image processing are executed, first, CPU 91 of image processing device 90 drives and controls camera 34 so as to capture the image of workpiece W in the supply area (S300). Subsequently, CPU 91 detects a region (workpiece region) of workpiece W and a region (background region) of other background in the obtained captured image as shown in FIG. 7 (S 310). This processing can be performed by comparing a color of the image with each of a color of workpiece W and a background acquired in advance for each pixel in the captured image. Then, CPU 91 extracts the contour of the detected workpiece region, and obtains area S and rough position P of the extracted contour (S320). For example, area S can be obtained by counting the number of pixels present in the contour of the workpiece region. For example, rough position P can be obtained, as shown in FIG. 8, by setting a circumscribed rectangle (refer to rectangular dashed lines in the drawing) with respect to the contour of the workpiece region, and obtaining center coordinates of the set circumscribed rectangle (rough positioning).

Figures 9, 9A, 9B:
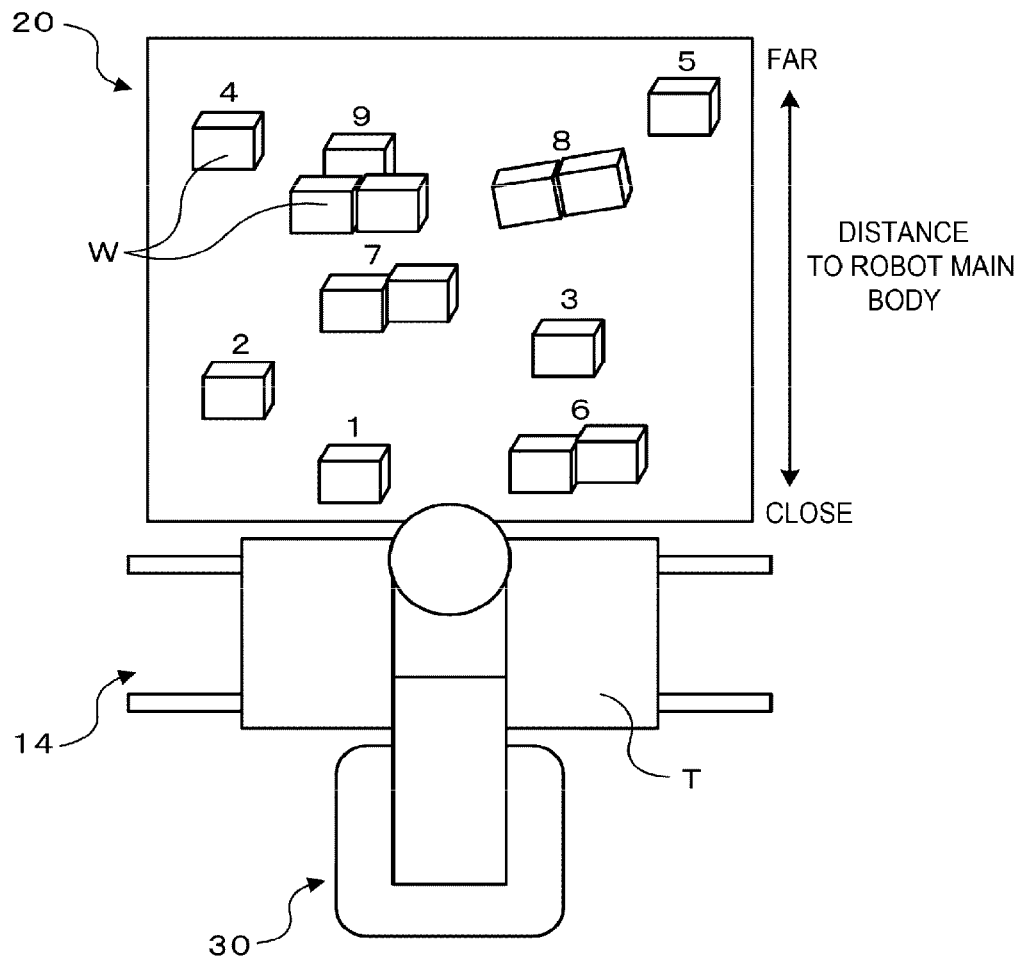
FIG. 9A is an explanatory diagram showing priority for each workpiece region.
FIG. 9B is an explanatory diagram showing a relationship between each workpiece region and the number of internally existing workpieces.

Next, CPU 91 determines the number of workpieces W (the number of internally existing workpieces) existing in one workpiece region (contour) in each recognized workpiece region based on area S obtained in Step S320 (S330). For example, the number of internally existing workpieces is determined to be one when area S of the workpiece region (contour) is equal to or more than a first determination value and less than a second determination value larger than the first determination value, determined to be two when area S is equal to or more than the second determination value and less than a third determination value larger than the second determination value, determined to be three when area S is equal to or more than the third determination value and less than a fourth determination value larger than the third determination value, and determined to be four or more when area S is equal to or more than the fourth determination value. It should be noted that the number of internally existing workpieces being one means that only one workpiece W exists in one recognized workpiece region (contour), and the number of internally existing workpieces being plural that multiple workpieces W are adjacent to or overlapping with each other in one recognized workpiece region (contour). Subsequently, CPU 91 obtains a distance (a distance from rough position P to robot main body 30) between each workpiece region and robot main body 30 (S340). Moreover, CPU 91 sets priority for each workpiece region based on the number of internally existing workpieces and the distance from the workpiece region to robot main body 30 (S350). FIG. 9A is an explanatory diagram showing priority for each workpiece region. FIG. 9B is an explanatory diagram showing a relationship between each workpiece region and the number of internally existing workpieces. In FIG. 9A, a number assigned to each workpiece region represents the priority. As shown in the drawings, the priority is set so as to be higher as the number of internally existing workpieces is smaller, and as long as the number of internally existing workpieces is the same, the priority is set so as to be higher as a distance to robot main body 30 or the work area which is the conveying position after gripping the workpiece is smaller. The reason why the priority is made higher as the number of internally existing workpieces is smaller is because it is considered that the smaller the number of internally existing workpieces, the easier it is to grip workpiece W existing in the corresponding workpiece region. The reason why the priority is made higher the smaller the distance to robot main body 30 or the work area is as follows. That is, arm 32 of robot main body 30 is a vertical articulated arm, and in order to convey workpiece W, it is necessary to move arm 32 in a state where the distal end of arm 32 is raised to a height at which interference with other workpieces W or workpiece supply device 20 can be avoided. At this time, the conveying distance of robot main body 30 can be shorter and the movement time thereof can be shortened when robot main body 30 is moved horizontally after the distal end of arm 32 gripping workpiece W is moved obliquely upward to a necessary height toward the work area rather than when robot main body 30 is moved horizontally after the distal end of arm 32 is raised in the vertical direction. Therefore, robot main body 30 grips the target workpiece while aligning arm 32 toward robot main body 30 side or the work area side so as to be easily conveyed to the work area. At this time, when there is a non-target workpiece other than the gripping target adjacent to robot main body 30 side or the work area side with respect to the target workpiece, the target workpiece may come into contact with the non-target workpiece and change the position of the non-target workpiece. In this case, since the work robot (image processing device 90) needs to perform the image recognition again in order to grip the non-target workpiece next, the work time extends. It is for this reason that the closer the distance to robot main body 30 or the work area, the higher the priority. Accordingly, by sequentially gripping workpieces W in order from the highest priority, it is possible to grip a greater number of workpieces W by one image recognition, and thus, the work time can be shortened.

After CPU 91 sets the priority of each workpiece region, CPU 91 next performs precise positioning on each workpiece W in each workpiece region using workpiece shape model D shown in FIG. 10A (S360). When multiple workpieces W exist in one workpiece region (contour) recognized in Step S320, CPU 91 performs precise positioning on each of internally existing multiple workpieces W. Workpiece shape model D is a template for pattern matching when accurately recognizing a contour shape of one workpiece W from the captured image. Workpiece shape model D includes a contour shape (refer to dashed lines) of workpiece W disposed in a posture capable of being gripped by robot main body 30, and picking position PP (gripping position) of workpiece W. Since workpiece shape model D differs for each type of workpiece W, workpiece shape model D is created for each type. As shown in FIG. 10B, the precise positioning is performed by searching workpiece W having a contour shape matching with workpiece shape model D while slightly changing the position and the posture of workpiece shape model D centered on rough position P obtained in Step S320. As shown in FIG. 10C, since the precise positioning can narrow a search range as compared with the case where workpiece W is searched while slightly changing the position and the posture of workpiece shape model D in the entire range of the captured image, it is possible to shorten a time required for pattern matching processing.

When performing the precise positioning in this manner, CPU 91 counts the number of workpieces W (number of total workpieces) recognized by the precise positioning (S370). Then, CPU 91 performs an interference check as to whether the picking tool interferes with a peripheral workpiece when workpiece W is gripped by the picking tool (S380). The interference check of workpiece W is performed by setting interference check region AI and determining whether a peripheral workpiece is present in interference check region AI. Interference check region AI is created based on a distal end shape of the picking tool and a shape of a movable range (range to which influence is exerted) of the picking tool. Since interference check region AI differs for each type of the picking tool, interference check region AI is created for each type.

FIG. 11A is an explanatory diagram showing interference check region AI of picking tool T1 (electromagnetic chuck) used for gripping a bolt-shaped workpiece. Interference check region AI of picking tool T1 (electromagnetic chuck) is created as a circular region to which a magnetic force of the electromagnetic chuck extends about picking position PP. FIG. 11B is an explanatory diagram showing interference check region AI of picking tool T2 (mechanical chuck) used for gripping a cylindrical workpiece. Interference check region AI of the mechanical chuck is created as two rectangular regions forming a movement region in which a pair of clamp claws of the mechanical chuck moves between a nearby position (gripping position) and a separation position (gripping release position) about picking position PP. FIG. 11C is an explanatory diagram showing interference check region AI of picking tool T3 (suction nozzle) used for gripping a cylindrical workpiece. Interference check region AI of the suction nozzle is created as a circular region to which a negative pressure of the suction nozzle extends about picking position PP.

FIG. 12A, FIG. 12B, and FIG. 12C are explanatory diagrams showing results of the interference check with respect to bolt-shaped workpiece W. FIG. 12A shows a state in which a screw tip of the bolt is erected. FIG. 12B shows a state in which a screw tip of a first bolt of the two bolts and a head portion of a second bolt thereof are close to each other. In the drawings, "o" represents a state that can be gripped, and "x" represents a state that cannot be gripped. In the interference check, it is determined that workpiece W cannot be gripped when the contour shape of workpiece W is not recognized by image processing device 90 (precise positioning) (refer to FIG. 12A) or when another workpiece W is present in interference check region AI of workpiece W (refer to FIG. 12B).

When CPU 91 performs the interference check of each workpiece W in this manner, CPU 91 determines the gripping order for each workpiece W so that workpiece W determined to be grippable by the interference check is gripped in order from workpiece W having the highest priority determined in Step S350 (S390), and ends this processing.

Here, a correspondence relationship between the configuration elements in the present embodiment and the configuration elements of the present disclosure will be clarified. Camera 34 of the present embodiment corresponds to an image-capturing device, image processing device 90 corresponds to an image processing device, control device 80 corresponds to a control device, and the work robot including robot main body 30, image processing device 90, and control device 80 corresponds to a work robot. Loosening device 25 corresponds to a loosening device.

As a matter of course, the present disclosure is not limited to the above-described embodiment and may be implemented in various aspects as long as the aspects belong within the technical scope of the present disclosure.

As described above, according to an aspect of the present disclosure, there is provided a work robot for sequentially holding multiple workpieces supplied to a supply area and moving the held workpieces to a work area, the work robot including: an image-capturing device configured to capture images of the multiple workpieces supplied to the supply area in random orientations and positions; an image processing device configured to recognize multiple workpiece regions from the images captured by the image-capturing device, obtain an area and a position of each of the recognized multiple workpiece regions, and obtain a distance between each workpiece region and the work area or the work robot; and a control device configured to determine a holding order of the workpiece based on the areas of the multiple workpiece regions and the distance between each workpiece region and the work area or the work robot as obtained by the image processing device.

The work robot of the present disclosure sequentially holds the multiple workpieces supplied to the supply area and moves the held workpieces to the work area. The work robot performs image recognition to capture images of the multiple workpieces supplied to the supply area in random orientations and positions, recognize multiple workpiece regions from the obtained images, obtain an area and a position of each of the recognized multiple workpiece regions, and obtain a distance between each workpiece region and the work area or the work robot. Then, the work robot determines the holding order of the workpiece based on the obtained area and distance. When it is difficult to vertically raise and lower the arm due to structural reasons, the work robot moves a target workpiece to the work area side or the work robot side on the supply area when holding the target workpiece which is a holding target. Therefore, when a non-target workpiece other than the holding target is adjacent to the work area side with respect to the target workpiece, the target workpiece may contact the non-target workpiece, and thus, there is a concern that the position of the non-target workpiece is changed. Accordingly, the work robot of the present disclosure determines the holding order of the multiple workpieces supplied in the random orientations and positions in consideration of the situation, and thus, can sequentially hold the multiple workpieces and move the multiple workpieces to the work area using the result of the image recognition performed first. As a result, it is possible to provide the work robot capable of efficiently holding multiple workpieces supplied to the supply area in the random orientations and positions.

In the work robot of the present disclosure, the image processing device may determine the number of workpieces existing inside the workpiece region based on the area of the workpiece region, and the control device may determine the holding order so that a workpiece located in a region where the number of existing workpieces is smaller among the multiple workpiece regions is held with a higher priority. This is because it is considered that the smaller the number of adjacent workpieces, the easier it is to grip the workpiece.

In the work robot according to the present disclosure, the control device may determine the holding order so that a workpiece located in a region having a shorter distance to the work area or the work robot is held with higher priority. This is because, in a case where the work robot (robot main body) grips the workpiece and takes the workpiece out while moving the workpiece to the work robot side, when a non-target workpiece which is not the gripping target is present on the work robot side with respect to the target workpiece which is the gripping target, there are concerns that the target workpiece come into contact with the non-target workpiece and the position of the non-target workpiece is changed. In addition, this is because, in a case where the work robot (robot main body) grips the target workpiece and takes the target workpiece out while moving the target workpiece to the work area side, when there is the non-target workpiece on the work area side with respect to the target workpiece, there are concerns that the target workpiece may come into contact with the non-target workpiece and the position of the non-target workpiece is changed.

Further, in the work robot of the present disclosure, the image processing device may determine whether the workpiece interferes with a peripheral workpiece when the workpiece is held by a tool mounted on a distal end of the work robot, and the control device may determine the holding order so that a workpiece determined not to interfere with the peripheral workpiece among multiple workpieces supplied to the supply area is held. In this case, the work robot may mount multiple types of tools, the image processing device may set an interference area in accordance with the tool mounted on the articulated arm, and perform interference determination for determining whether the workpiece interferes with the peripheral workpiece based on whether the peripheral workpiece is present in the set interference area. Moreover, in this case, the image processing device may recognize the workpiece and a background based on the image captured by the image-capturing device to perform rough positioning of the workpiece region, and perform precise positioning of each workpiece in the region by applying pattern matching to the image based on a result of the rough positioning prior to performing the interference determination. As a result, it is possible to shorten a time required for the pattern matching processing.

In addition, the present disclosure may also be in the form of a work system. That is, according to another aspect of the present disclosure, there is provided a work system including: the work robot of the above-described present disclosure; and a loosening device configured to loosen a lump of the multiple workpieces supplied to the supply area, in which the control device drives and controls the loosening device when it is determined that the workpiece remains in the supply area and none of the remaining workpieces is held by the work robot. The work system includes the work robot according to the present disclosure, and thus, it is possible to reduce the number of times the loosening device is driven, and it is possible to reduce the number of executions of the image recognition. As a result, it is possible to further improve work efficiency.

INDUSTRIAL APPLICABILITY

The present disclosure can be used for a manufacturing industry of a work robot and the like.

REFERENCE SIGNS LIST

10: Work system, 12: Support table, 14: Tray conveyance device, 20: workpiece supply device, 21: Conveyor belt, 22: Driving roller, 23: Driven roller, 25: loosening device, 30: Robot main body, 32: Arm, 34: Camera, 41: First link, 42: Second link, 43: Third link, 44: Fourth link, 45: Fifth link, 46: Sixth Link, 51: First joint, 52: Second joint, 53: Third joint, 54: Fourth joint, 55 Fifth joint, 61 to 65: Motor, 66: Tool actuator, 71 to 75: Encoder, 80: Control device, 81: CPU, 82: ROM, 83: HDD, 84: RAM, 90: Image processing device, 91: CPU, 92: ROM, 93: HDD, 94: RAM, 95: Input device, 96: Output device, W: Workpiece, T: Tray, T1 to T3: Picking tool, PP: Picking position, AI: Interference check region

The invention claimed is:

1. A work robot for sequentially holding multiple workpieces supplied to a supply area and moving the held workpieces to a work area, the work robot comprising:
   an image-capturing device configured to capture images of the multiple workpieces supplied to the supply area in random orientations and positions;
   an image processing device configured to
      recognize multiple workpiece regions from the images captured by the image-capturing device,
      obtain an area and a position of each of the recognized multiple workpiece regions,
      determine the number of workpieces existing inside the workpiece region based on the area of the workpiece region,
      obtain a distance between each workpiece region and the work area or the work robot,
      determine a priority for each workpiece region based on the number of workpieces existing inside the multiple workpiece regions and the distance between each workpiece region and the work area or the work robot as obtained by the image processing device, the priority being set so that a workpiece located in a region where the number of existing workpieces is smaller among the multiple workpiece regions is held with a higher priority, and when the number of existing workpieces is the same among the multiple workpiece regions, a workpiece located in a region having a shorter distance to the work area or the work robot is held with a higher priority,
      perform precise positioning of each workpiece in the region by applying pattern matching to the image, and counting a number of workpieces recognized by the precise positioning,
      perform an interference check of each workpiece to determine whether the workpiece interferes with a peripheral workpiece when the workpiece is held by a tool mounted on a distal end of the work robot, and
      determine a gripping order for each workpiece so that the workpiece determined to be grippable by the interference check is gripped in order from the workpiece having the highest priority; and
   a control device configured to set a gripping target workpiece according to the gripping order, and control the work robot to grip to gripping target workpiece.

2. The work robot according to claim 1,
   wherein the work robot mounts multiple types of tools, and
   the image processing device sets an interference area in accordance with the tool mounted on the articulated arm, and performs the interference check based on whether the peripheral workpiece is present in the set interference area.

3. The work robot according to claim 2,
   wherein the work robot mounts an electromagnetic chuck configured to grip a bolt-shaped workpiece, a mechanical chuck configured to grip a cylindrical workpiece, and a suction nozzle configured to grip the cylindrical workpiece.

4. A work system comprising:
   the work robot according to claim 1; and
   a loosening device configured to loosen a lump of the multiple workpieces supplied to the supply area,
   wherein the control device drives and controls the loosening device when it is determined that the workpiece remains in the supply area and none of the remaining workpieces is held by the work robot.

* * * * *